(12) United States Patent
Ryuzaki et al.

(10) Patent No.: US 11,067,139 B2
(45) Date of Patent: Jul. 20, 2021

(54) VEHICLE TRANSMISSION SYSTEM

(71) Applicant: HONDA MOTOR CO., LTD., Tokyo (JP)

(72) Inventors: Tatsuya Ryuzaki, Wako (JP); Junya Ono, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 24 days.

(21) Appl. No.: 16/624,309

(22) PCT Filed: Jun. 18, 2018

(86) PCT No.: PCT/JP2018/023100
§ 371 (c)(1),
(2) Date: Dec. 19, 2019

(87) PCT Pub. No.: WO2019/003978
PCT Pub. Date: Jan. 3, 2019

(65) Prior Publication Data
US 2021/0148417 A1 May 20, 2021

(30) Foreign Application Priority Data
Jun. 30, 2017 (JP) .............................. JP2017-129318

(51) Int. Cl.
*F16D 48/06* (2006.01)
*F16D 48/02* (2006.01)

(52) U.S. Cl.
CPC ........... *F16D 48/02* (2013.01); *F16D 48/068* (2013.01); *F16D 2048/023* (2013.01);
(Continued)

(58) Field of Classification Search
CPC ... F16D 2500/30808; F16D 2500/3111; F16D 2500/70406
See application file for complete search history.

(56) References Cited

U.S. PATENT DOCUMENTS

| 8,271,170 B2 * | 9/2012 | Fukaya | F16D 48/0206 |
| | | | 701/68 |
| 2002/0002101 A1 | 1/2002 | Hayashi | |

(Continued)

FOREIGN PATENT DOCUMENTS

| CN | 1061000 | 5/1992 |
| CN | 1028736 | 6/1995 |

(Continued)

OTHER PUBLICATIONS

Chinese Office Action for Chinese Patent Application No. 201880043133.3 dated Aug. 5, 2020.
(Continued)

*Primary Examiner* — Timothy Hannon
(74) *Attorney, Agent, or Firm* — Amin, Turocy & Watson, LLP

(57) ABSTRACT

This vehicle transmission system includes a transmission (21), a clutch device (26), a clutch control unit (61), and a shift operation detecting means (48), and, when a hydraulic pressure is supplied from a clutch actuator (50) to a slave cylinder (28), the clutch device (26) moves to a connection side, in an in-gear stop state in which the transmission (21) is in an in-gear state, and a vehicle (1) is in a stop state, the clutch actuator (50) supplies a standby hydraulic pressure (WP) to the slave cylinder (28), and the clutch control unit (61) sets the standby hydraulic pressure (WP) to a first setting value (P1) during non-detection in which a shift operation is not detected by the shift operation detecting means (48) and sets the standby hydraulic pressure (WP) to a second setting value (P2) lower than the first setting value (P1) when the shift operation is detected by the shift operation detecting means (48).

8 Claims, 10 Drawing Sheets

(52) U.S. Cl.
CPC ............... *F16D 2500/1026* (2013.01); *F16D 2500/1117* (2013.01); *F16D 2500/3067* (2013.01); *F16D 2500/30806* (2013.01); *F16D 2500/3111* (2013.01); *F16D 2500/31413* (2013.01); *F16D 2500/70406* (2013.01)

(56) References Cited

U.S. PATENT DOCUMENTS

2008/0312035 A1    12/2008  Murayama et al.
2009/0298648 A1*   12/2009  Sigmund ............ F16D 48/0206
                                                         477/169

FOREIGN PATENT DOCUMENTS

| CN | 201276021 | 7/2009 |
|---|---|---|
| CN | 103380038 | 10/2013 |
| CN | 203477132 | 3/2014 |
| CN | 103380038 | 8/2016 |
| DE | 2141564 | 2/1973 |
| EP | 0984186 | 3/2000 |
| GB | 981313 | 6/1963 |
| GB | 1383567 | 2/1974 |
| GB | 2506673 | 4/2014 |
| JP | 60-078119 | 5/1985 |
| JP | 08-139395 | 7/1996 |
| JP | 2000-145934 | 5/2000 |
| JP | 2002-21883 | 1/2002 |
| JP | 2009-275760 | 11/2009 |
| JP | 2011-075030 | 4/2011 |
| WO | 2015/191308 | 12/2015 |

OTHER PUBLICATIONS

Extended European Search Report for European Patent Application No. 18824207.7 dated Feb. 28, 2020.
International Search Report and Written Opinion for International Application Serial No. PCT/JP2018/023100 dated Aug. 28, 2018, 7 pages.

* cited by examiner

VEHICLE TRANSMISSION SYSTEM

TECHNICAL FIELD

The present invention relates to a vehicle transmission system.

The present application claims priority based on Japanese Patent Application No. 2017-129318 filed on Jun. 30, 2017, the contents of which are incorporated herein by reference.

BACKGROUND ART

In a transmission used for a motorcycle and the like, a transmission operation of a transmission is performed by a driver, but a semi-automatic transmission system of a type in which only an intermittent operation of a clutch of the transmission is automatically performed is known as well (for example, see Patent Document 1).

In such a transmission system, proposals for not only an intermittent operation of a clutch of a transmission but for resolving an inconvenience occurring during a transmission operation through control of the clutch have been made.

For example, in Patent Document 1, a configuration in which, when a transmission request is detected, in a case in which a dog contact state, in which the dog teeth of a dog clutch disposed in a transmission gear of a transmission have not entered into dog holes, occurs, by causing a temporary half-clutch state to occur in a clutch that is in an cut-off state, the clutch is driven in a connection direction, and a driving side and a driven shaft of the dog clutch are relatively rotated, whereby the dog contact state is resolved is disclosed.

RELATED ART DOCUMENT

Patent Document

Patent Document 1: Japanese Unexamined Patent Application, First Publication No. 2009-275760

SUMMARY

Problems to be Solved by the Invention

In the case of a transmission system automatically performing only an intermittent operation of a clutch, even when the vehicle is decelerated, the gear of the transmission is not automatically changed unless a driver does not perform a transmission operation of the transmission. When the transmission is in an in-gear state of a first speed or the like at the time of stopping of the vehicle, a standby hydraulic pressure is supplied to a slave cylinder operating the clutch for quick restart. For this reason, even when a transmission that is in an in-gear state is attempted to be shifted at the time of stopping of the vehicle (for example, a shift from the first speed to neutral), a gear shift operation of a shift pedal becomes heavy due to resistance according to a contact between the dog teeth and the dog holes in a rotation direction, and there are cases in which it is difficult to perform a shift operation of the transmission.

The present invention is in consideration of such situations, and an object thereof is to provide a vehicle transmission system capable of easily performing a shift operation even in a case in which a vehicle stops in a state in which a transmission is in an in-gear state.

Means for Solving the Problem

As resolving means of the problems described above, aspects of the present invention have the following configurations.

(1) A vehicle transmission system according to an aspect of the present invention includes: a transmission of which transmission is performed in accordance with an operation of a driver of a vehicle; a clutch device that is disposed between a power transmission path between the transmission and an engine of the vehicle and is coupled or decoupled in accordance with an operation of a clutch actuator; a clutch control unit that controls coupling/decoupling of the clutch device according to the clutch actuator; and a shift operation detecting means that detects a shift operation of the driver on a shift operator, wherein, when a hydraulic pressure is supplied from the clutch actuator to a slave cylinder, the clutch device moves to a connection side, in an in-gear stop state in which the transmission is in an in-gear state, and the vehicle is in a stop state, the clutch actuator supplies a standby hydraulic pressure to the slave cylinder, and the clutch control unit sets the standby hydraulic pressure to a first setting value during non-detection in which the shift operation is not detected by the shift operation detecting means and sets the standby hydraulic pressure to a second setting value lower than the first setting value when the shift operation is detected by the shift operation detecting means.

(2) In the vehicle transmission system according to (1) described above, the shift operator may be a shift pedal, and the clutch control unit may set the standby hydraulic pressure to the second setting value in a case in which a shift operation causing the shift pedal to swing to an upper side is detected by the shift operation detecting means.

(3) In the vehicle transmission system according to (1) or (2) described above, the clutch control unit may set the standby hydraulic pressure to the second setting value in a case in which a shift operation of shifting a gear position of the transmission from a first speed to neutral is detected.

(4) In the vehicle transmission system according to any one of (1) to (3) described above, the clutch control unit may continue a state in which the standby hydraulic pressure is set to the second setting value until a detection state in which the shift operation is detected by the shift operation detecting means transitions to a non-detection state in which the shift operation is not detected.

(5) In the vehicle transmission system according to any one of (1) to (3) described above, the clutch control unit may continue a state in which the standby hydraulic pressure is set to the second setting value for a setting time determined in advance.

(6) The vehicle transmission system according to any one of (1) to (5) described above may further include: a shift spindle that protrudes from a transmission case and is connected to the shift operator; and a shift arm that is fixed to the shift spindle and transmits movement to the transmission side by swinging from a neutral position in accordance with the shift operation on the shift operator, wherein the shift operation detecting means may detect movement of the shift arm from the neutral position.

(7) In the vehicle transmission system according to any one of (1) to (6) described above, the clutch control unit may determine that the vehicle is in the stop state in a case in which a vehicle speed is lower or equal to or lower than a setting value set in advance.

(8) In the vehicle transmission system according to any one of (1) to (7) described above, the clutch control unit may determine that the vehicle is in the stop state in a case in which at least one of a throttle opening degree being lower than or equal to or lower than a setting value set in advance and an engine speed being lower than or equal to or lower than a setting value set in advance is satisfied.

Advantage of the Invention

According to the vehicle transmission system described in above-described (1) of the present invention, in an in-gear stop state in which the transmission is in an in-gear state, and the vehicle is in a stop state, when the shift operation detecting means detects a shift operation, a standby hydraulic pressure supplied to the slave cylinder is decreased. Accordingly, resistance due to a contact between a driving side and a driven side of engagement elements of the transmission in a rotation direction is reduced, and a shift operation of the transmission can be configured to be light. In other words, even in a case in which a vehicle stops in a case in which the transmission is in the in-gear state, a shift operation can be easily performed.

According to the vehicle transmission system described in above-described (2) of the present invention, the standby hydraulic pressure is decreased in a case in which a shift operation causing the shift pedal to swing to an upper side is detected, and accordingly, erroneous detection of a shift operation according to a load of a foot on the shift pedal can be eliminated. In addition, normally, the transmission is shifted up in accordance with swing of the shift pedal to the upper side, and neutral is positioned between the first speed and the second speed of the gear position. Accordingly, when a shift change from the first speed to the neutral is performed at the time of stopping the vehicle, by decreasing the standby hydraulic pressure, a neutral output can be easily performed.

According to the vehicle transmission system described in above-described (3) of the present invention, when a shift operation from the first speed to the neutral is performed at the time of stopping the vehicle, by decreasing the standby hydraulic pressure, a neutral output can be easily performed.

According to the vehicle transmission system described in above-described (4) of the present invention, by continuing a state in which the standby hydraulic pressure is set to the second setting value until the shift operation ends, the shift operation can be reliably configured to be light.

According to the vehicle transmission system described in above-described (5) of the present invention, by continuing a state in which the standby hydraulic pressure is set to the second setting value for an arbitrary setting time, feeling as control regardless of the speed of the shift operation can be improved.

According to the vehicle transmission system described in above-described (6) of the present invention, the standby hydraulic pressure is decreased in accordance with detection of movement of the shift arm fixed to the shift spindle from the neutral position, and accordingly, compared to a case in which movement of a shift drum or the like that is disposed on the transmission side from the shift arm is detected, or a shift operation load is detected, a shift operation can be detected also for slight movement in the initial period of the shift operation.

According to the vehicle transmission system described in above-described (7) of the present invention, by setting a vehicle speed used for determining a stop state of a vehicle to an arbitrary setting value, for example, even in a case in which the hydraulic pressure supplied to the slave cylinder is configured to be decreased to the standby hydraulic pressure at a clutch-open vehicle speed before complete stop, the second setting value can be set in accordance with the clutch-open vehicle speed, and accordingly, a shift operation in the in-gear stop state can be easily performed reliably.

According to the vehicle transmission system described in above-described (8) of the present invention, in order to determine a stop state of a vehicle, by also using the throttle opening degree and the engine speed in addition to the vehicle speed, after checking a preparation step for stopping the vehicle, the second setting value can be set, and accordingly, a shift operation in the in-gear stop state can be easily performed reliably.

DESCRIPTION OF THE EMBODIMENTS

Hereinafter, an embodiment of the present invention will be described with reference to the drawings. In addition, in the following description, directions such as forward, rearward, left, right, and the like are the same as those in a vehicle to be described below unless otherwise mentioned. Furthermore, an arrow FR representing a vehicle front side, an arrow LH representing a vehicle left side, and an arrow UP representing a vehicle upper side are illustrated at appropriate places in drawings used in the following description.

Figure 1:
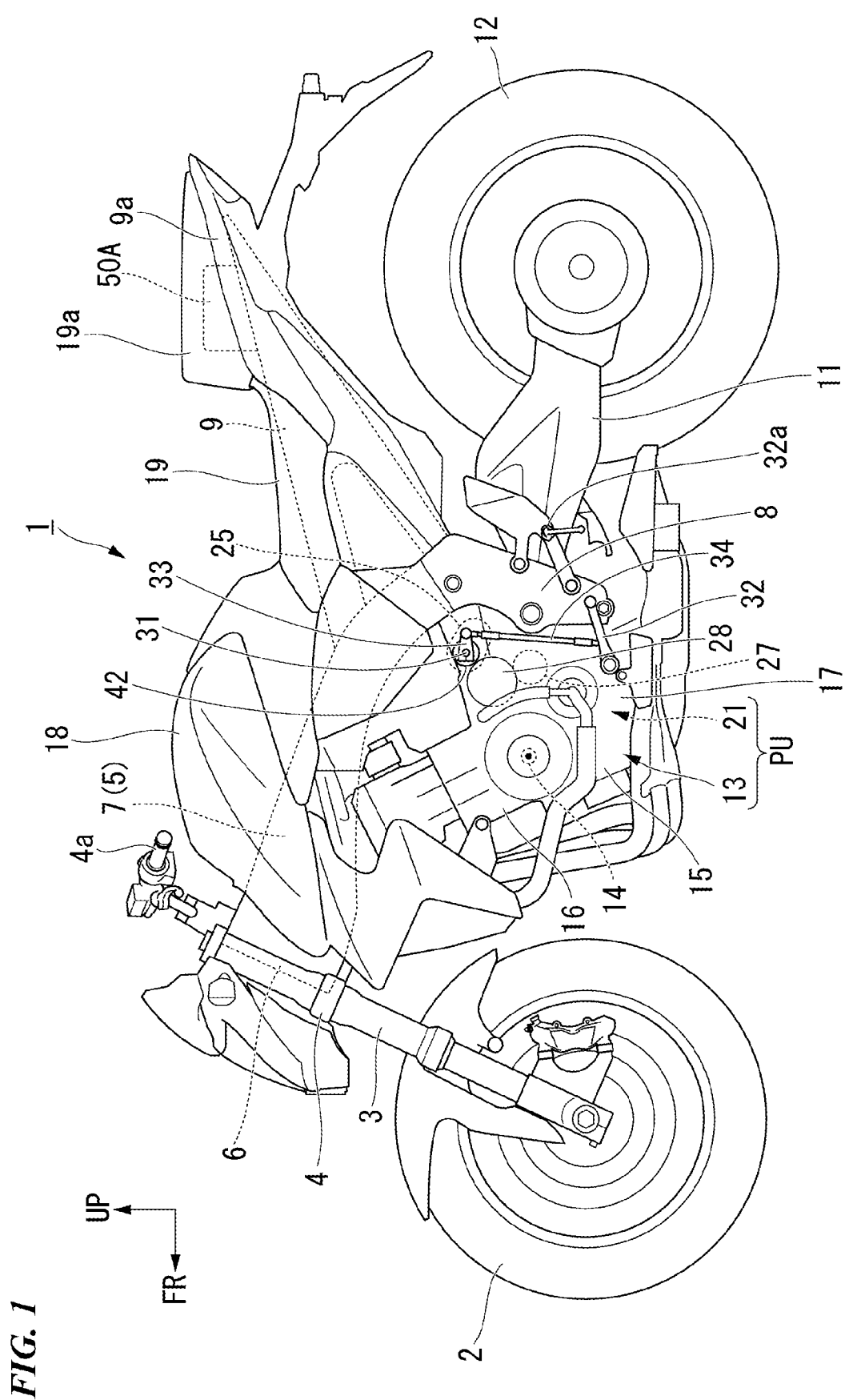
FIG. 1 is a left side view of a motorcycle according to an embodiment of the present invention.

As illustrated in FIG. 1, this embodiment is applied to a motorcycle 1 that is a saddle riding-type vehicle (vehicle). A front wheel 2 of the motorcycle 1 is supported by lower ends of one pair of left and right front forks 3. Upper parts of the left and right front forks 3 are supported by a head pipe 6 of a front end of a vehicle body frame 5 through a steering stem 4. A bar-type steering handle 4a is mounted on a top bridge of the steering stem 4.

The vehicle body frame 5 includes a head pipe 6, a main tube 7 that extends from the head pipe 6 toward a rear lower side at the center in a vehicle width direction (leftward/rightward direction), left and right pivot frames 8 connected to a lower side of a rear end of the main tube 7, and a seat frame 9 connected to the rear side of the main tube 7 and the left and right pivot frames 8. In the left and right pivot frames 8, a front end of a swing arm 11 is pivoted to be swingable. At a rear end of the swing arm 11, a rear wheel 12 of the motorcycle 1 is supported.

On an upper side of the left and right main tubes 7, a fuel tank 18 is supported. On a side behind the fuel tank 18, a front seat 19 and a rear seat cover 19a are aligned in front of and behind each other and supported on the seat frame 9. The periphery of the seat frame 9 is covered with a rear cowl 9a. Below the left and right main tubes 7, a power unit PU that is a motor of the motorcycle 1 is suspended. The power unit PU is linked with the rear wheel 12, for example, through a chain-type transmission mechanism.

The power unit PU integrally includes an engine 13 positioned on the front side thereof and a transmission 21 positioned on the rear side. The engine 13, for example, is a multiple cylinder engine in which a rotary shaft of a crank shaft 14 is aligned along the leftward/rightward direction (vehicle width direction). The engine 13 raises a cylinder 16 above a front part of a crank case 15. A rear part of the crank case 15 is formed as a transmission case 17 that houses the transmission 21.

Figure 2:
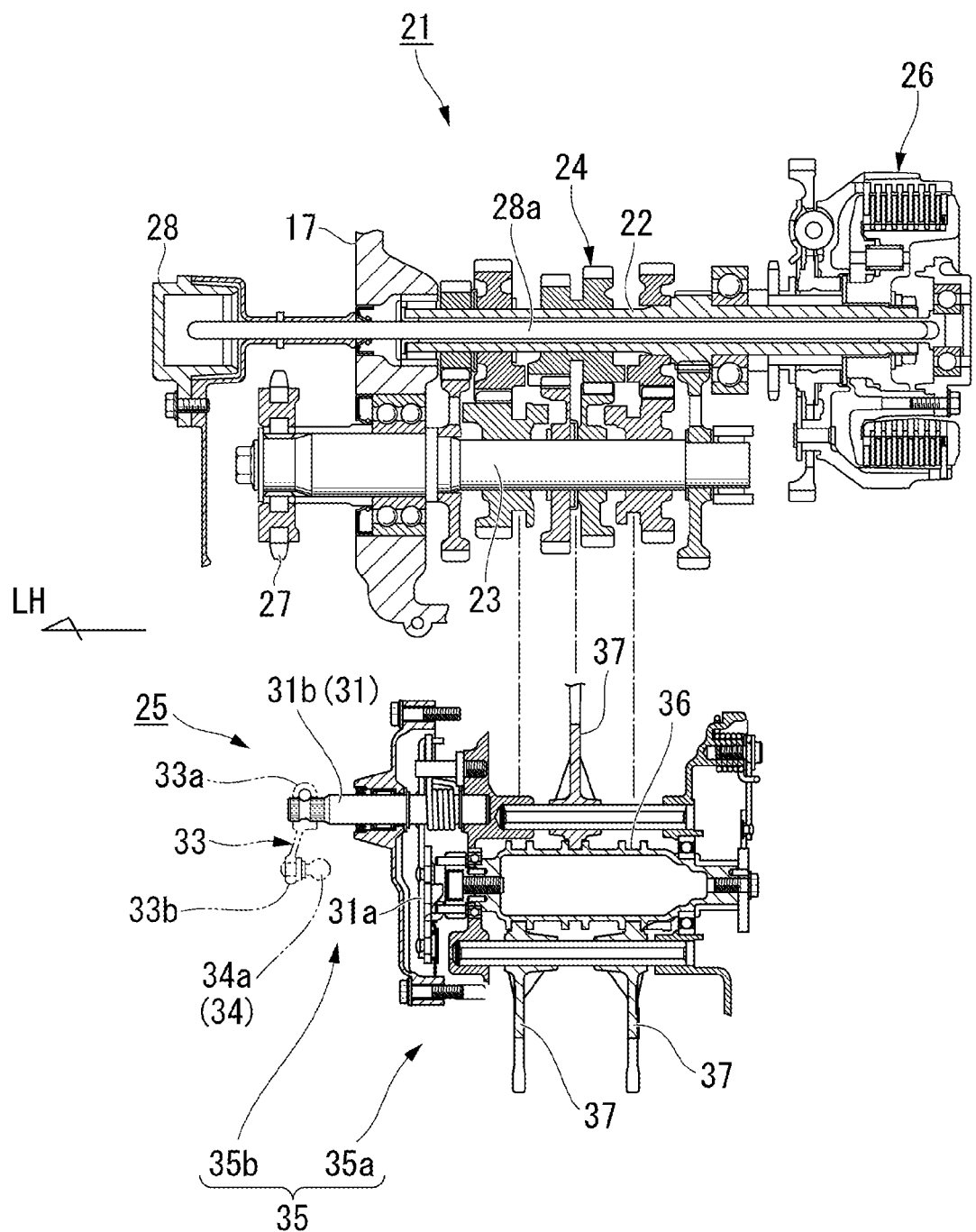
FIG. 2 is a cross-sectional view of a transmission and a change mechanism of the motorcycle.

As illustrated in FIG. 2, the transmission 21 is a stepped transmission including a main shaft 22, a counter shaft 23, and a transmission gear group 24 disposed across both the shafts 22 and 23. The counter shaft 23 configures an output shaft of not only the transmission 21 but also the power unit PU. An end of the counter shaft 23 protrudes to the left side of a rear part of the crank case 15 and is connected to the rear wheel 12 through the chain-type transmission mechanism.

The transmission gear group 24 includes gears corresponding to the number of transmission steps supported at both the shafts 22 and 23. The transmission 21 is a constant mesh type in which a pair of corresponding gears of the transmission gear group 24 are constantly engaged with each other between the both shafts 22 and 23. A plurality of gears supported at both the shafts 22 and 23 can be classified into a free gear that can rotate with respect to a corresponding shaft and a slide gear (shifter) that is spline-fitted to a corresponding shaft. On one side of the free gear and the slide gear, a convex dog is disposed in the axial direction, and, on the other side, a concave slot is disposed in the axial direction so as to be engaged with the dog. In other words, the transmission 21 is a so-called dog mission.

Figure 3:
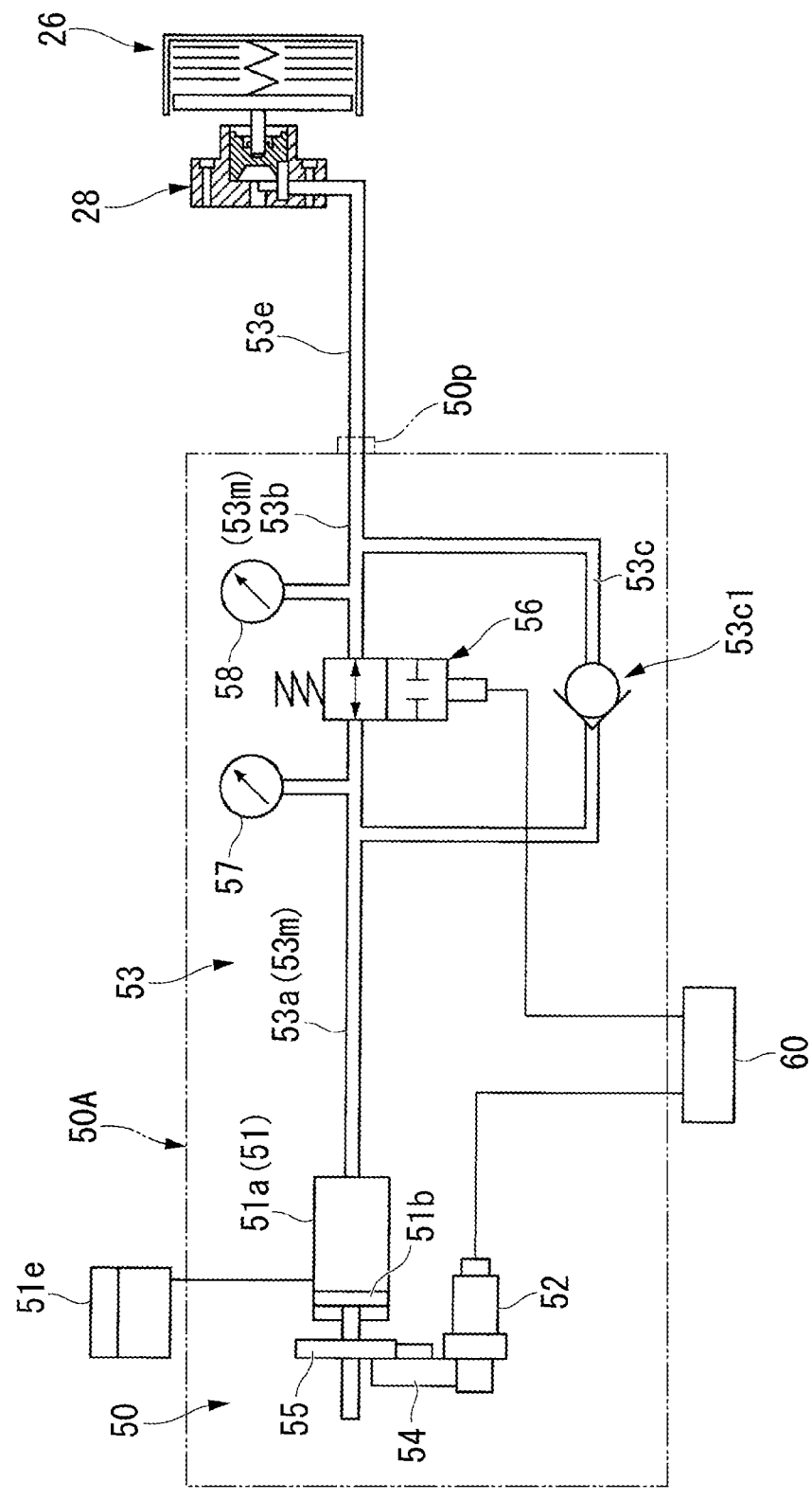
FIG. 3 is a schematic explanatory diagram of a clutch operating system including a clutch actuator.

Referring to FIG. 3, the main shaft 22 and the counter shaft 23 of the transmission 21 are arranged to be aligned in front of and behind each other on the side behind the crank shaft 14. At a right end of the main shaft 22, a clutch device 26 operated by a clutch actuator 50 is coaxially disposed. The clutch device 26, for example, is a wet multiplate clutch and a so-called normal open clutch. In other words, the clutch device 26 reaches a connection state in which power can be transmitted in accordance with the supply of a hydraulic pressure from the clutch actuator 50 and is returned to a cut-off state in which power cannot be transmitted when the supply of the hydraulic pressure from the clutch actuator 50 disappears.

Referring to FIG. 2, the rotation power of the crank shaft 14 is transmitted to the main shaft 22 through the clutch device 26 and is transmitted from the main shaft 22 to the counter shaft 23 through an arbitrary gear pair of the transmission gear group 24. At a left end of the counter shaft 23 that protrudes to the left side of a rear part of the crank case 15, a drive sprocket 27 of the chain-type transmission mechanism is mounted.

Above the rear of the transmission 21, a change mechanism 25 that performs switching between gear pairs of the transmission gear group 24 is housed. The change mechanism 25 operates a plurality of shift forks 37 in accordance with the pattern of a lead groove formed on the outer periphery thereof in accordance with rotation of a shift drum 36 having a hollow cylindrical shape parallel to both the shafts 22 and 23 and performs switching of a gear pair used for power transmission between both the shafts 22 and 23 in the transmission gear group 24.

The change mechanism 25 includes a shift spindle 31 parallel to the shift drum 36. At the time of rotation of the shift spindle 31, a shift arm 31a fixed to the shift spindle 31 rotates the shift drum 36, moves the shift fork 37 in the axial direction in accordance with the pattern of the lead groove and switches a gear pair that can transmit power in the transmission gear group 24 (in other words, a transmission step is changed).

The shift spindle 31 causes a shaft outer part 31b to protrude to an outward side (left side) of the crank case 15 in the vehicle width direction such that the change mechanism 25 can be operated. A shift load sensor 42 is coaxially mounted in the shaft outer part 31b of the shift spindle 31 (see FIG. 1). A swing lever 33 is mounted in the shaft outer part 31b of the shift spindle 31 (or a rotation shaft of the shift load sensor 42). The swing lever 33 extends from a base end part 33a that is fixed to the shift spindle 31 (or the rotation shaft) through clamp fixing to the rear side, and an upper end of a link rod 34 is connected to a tip end part 33b thereof through an upper ball joint 34a to be freely swingable. A lower end of the link rod 34 is connected to a shift pedal (shift operator) 32 that is operated by a driver using a foot through a lower ball joint (not illustrated in the drawing) to be swingable.

As illustrated in FIG. 1, the shift pedal 32 has a front end supported at a lower part of the crank case 15 to be vertically swingable through a shaft along a leftward/rightward direction. A pedal part on which a driver's toes in a step 32a are placed is disposed in a rear end of the shift pedal 32, and a lower end of the link rod 34 is connected to a middle part before and after the shift pedal 32.

As illustrated in FIG. 2, a shift change device 35 that includes the shift pedal 32, the link rod 34, and the change mechanism 25 and performs switching of a transmission step gear of the transmission 21 is configured. In the shift change device 35, an assembly (the shift drum 36, the shift forks 37, and the like) that switches a transmission step of the transmission 21 inside the transmission case 17 will be referred to as a transmission operating unit 35a, and an assembly (the shift spindle 31, the shift arm 31a, and the like) to which a transmission operation for the shift pedal 32 is input and rotates around the shift spindle 31 and transmits this rotation to the transmission operating unit 35a will be referred to as a transmission operation receiving unit 35b.

Here, the motorcycle 1 employs a so-called semi-automatic transmission system (vehicle transmission system) in which only a transmission operation of the transmission 21 (a foot operation of the shift pedal 32) is performed by a driver, and a coupling/decoupling operation of the clutch device 26 is automatically performed through electrical control in accordance with an operation on the shift pedal 32.

Figure 4:
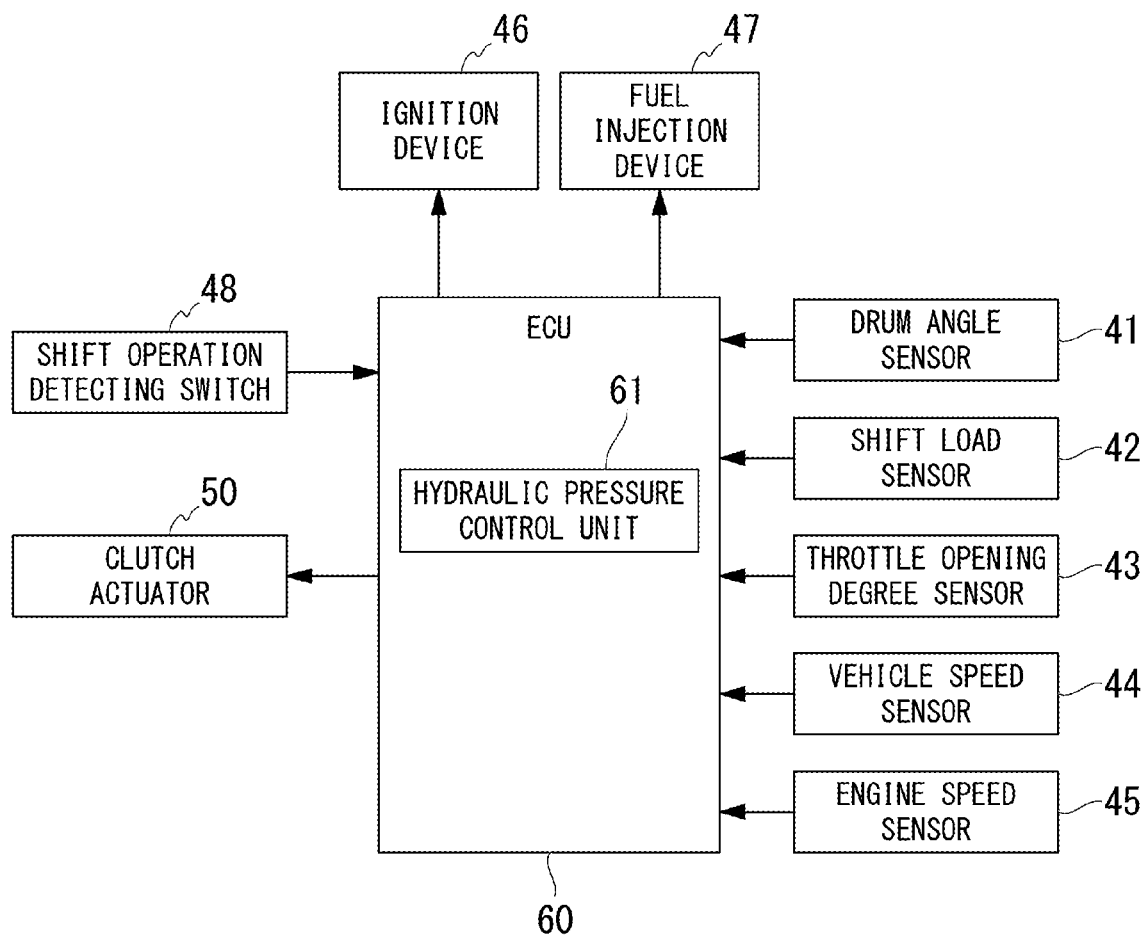
FIG. 4 is a block diagram of a transmission system.

As illustrated in FIG. 4, the transmission system described above includes a clutch actuator 50, an electronic control unit (ECU; control device) 60, and various sensors 41 to 45.

The ECU 60 controls the operation of an ignition device 46 and a fuel injection device 47 together with controlling the operation of the clutch actuator 50 on the basis of detection information from a drum angle sensor (gear position sensor) 41 detecting a transmission step number from a rotation angle of the shift drum 36 and the shift load sensor (torque sensor) 42 detecting an operation torque input to the shift spindle 31 and various types of vehicle state detection information from a throttle opening degree sensor 43, a vehicle speed sensor 44, and an engine speed sensor 45, and the like. Detection information from hydraulic pressure sensors 57 and 58 and a shift operation detecting switch (shift operation detecting means) 48 to be described later is also input to the ECU 60.

In addition, the ECU 60 includes a hydraulic pressure control unit (clutch control unit) 61, and such a function will be described later.

Referring also to FIG. 3, the clutch actuator 50 can control a liquid pressure used for coupling/decoupling the clutch device 26 by being controlled such that it operates by the ECU 60. The clutch actuator 50 includes an electric motor 52 (hereinafter, simply referred to as a motor 52) as a drive source and a master cylinder 51 driven by the motor 52. The clutch actuator 50 configures a clutch control unit 50A as one body together with the hydraulic pressure circuit device 53 disposed between the master cylinder 51 and a hydraulic pressure supply-discharge port 50p.

The ECU 60 calculates a target value of a hydraulic pressure (target hydraulic pressure) supplied to a slave cylinder 28 for coupling/decoupling the clutch device 26 on the basis of a calculation program set in advance and controls the clutch control unit 50A such that a hydraulic pressure (a current hydraulic pressure) of the slave cylinder 28 side that is detected by a downstream-side hydraulic pressure sensor 58 is close to the target hydraulic pressure.

The master cylinder 51 causes a piston 51b inside a cylinder main body 51a to perform a stroke in accordance with driving of the motor 52 and enables the supply/discharge of hydraulic oil inside the cylinder main body 51a for the slave cylinder 28. In addition, in the drawing, a reference numeral 55 represents a conversion mechanism as a ball screw mechanism, a reference numeral 54 represents a transmission mechanism disposed across the motor 52 and the conversion mechanism 55, and a reference numeral 51e represents a reservoir connected to the master cylinder 51.

The hydraulic pressure circuit device 53 includes a valve mechanism (a solenoid valve 56) opening or blocking a middle portion of a main oil path (a hydraulic pressure supply/discharge oil path) 53m extending from the master cylinder 51 to the clutch device 26 side (the slave cylinder 28 side). The main oil path 53m of the hydraulic pressure circuit device 53 can be divided into an upstream-side oil path 53a that is on the master cylinder 51 side from the solenoid valve 56 and a downstream-side oil path 53b that is on the slave cylinder 28 side from the solenoid valve 56. In addition, the hydraulic pressure circuit device 53 includes a bypass oil path 53c that bypasses the solenoid valve 56 and causes the upstream-side oil path 53a and the downstream-side oil path 53b to communicate with each other.

The solenoid valve 56 is a so-called normal open valve. A one-way valve 53c1 causing a hydraulic oil to flow in only one way from the upstream side to the downstream side is disposed in the bypass oil path 53c. On the upstream side of the solenoid valve 56, an upstream-side hydraulic pressure sensor 57 detecting a hydraulic pressure of the upstream-side oil path 53a is disposed. On the downstream side of the solenoid valve 56, a downstream-side hydraulic pressure sensor 58 detecting a hydraulic pressure of the downstream-side oil path 53b is disposed.

As illustrated in FIG. 1, the clutch control unit 50A, for example, is housed in the rear cowl 9a. The slave cylinder 28 is mounted on the left side of the rear part of the crank case 15. The clutch control unit 50A and the slave cylinder 28 are connected through a hydraulic piping 53e (see FIG. 3).

As illustrated in FIG. 2, the slave cylinder 28 is coaxially disposed on the left side of the main shaft 22. When a hydraulic pressure is supplied from the clutch actuator 50, the slave cylinder 28 presses a push rod 28a passing through the inside of the main shaft 22 to the right side. By pressing the push rod 28a to the right side, the slave cylinder 28 operates the clutch device 26 to be in a connected state through the push rod 28a. When the supply of the hydraulic pressure disappears, the slave cylinder 28 releases the pressing of the push rod 28a and returns the clutch device 26 to a disconnected state.

In order to maintain the clutch device 26 to be in the connected state, it is necessary to continue the supply of the hydraulic pressure, and power is consumed as that much. Thus, as illustrated in FIG. 3, the solenoid valve 56 is disposed in the hydraulic pressure circuit device 53 of the clutch control unit 50A, and the solenoid valve 56 is closed after the supply of the hydraulic pressure to the clutch device 26 side. In this way, the hydraulic pressure supplied to the clutch device 26 side is maintained, and a hydraulic pressure corresponding to a decrease in the pressure is configured to be supplemented (recharged by an amount corresponding to a leak), whereby the energy consumption is inhibited.

Next, an action of a clutch control system will be described with reference to a graph illustrated in FIG. 5. In the graph illustrated in FIG. 5, the vertical axis represents a supplied hydraulic pressure detected by the downstream-side hydraulic pressure sensor 58, and the horizontal axis represents an elapsed time.

At the time of stopping (idling) of the motorcycle 1, both the motor 52 and the solenoid valve 56 controlled by the ECU 60 are in a state in which the supply of power is blocked. In other words, in a stop state of the motor 52, the solenoid valve 56 is in an open-valve state. At this time, the slave cylinder 28 side (the downstream side) is in a low-pressure state having a pressure lower than a touch point hydraulic pressure TP, and the clutch device 26 is in a non-fastened state (a disconnected state, a released state). This state corresponds to an area A illustrated in FIG. 5.

At the time of starting the motorcycle 1, when the speed of the engine 13 is increased, power is supplied only to the motor 52, and a hydraulic pressure is supplied from the master cylinder 51 to the slave cylinder 28 through the solenoid valve 56 that is in the open-valve state. When the hydraulic pressure of the slave cylinder 28 side (the downstream side) rises to be equal to or higher than the touch point hydraulic pressure TP, the fastening of the clutch device 26 starts, and the clutch device 26 becomes in a half-clutch state in which a part of power can be transmitted. In this way, smooth start of the motorcycle 1 can be performed. This state corresponds to an area B illustrated in FIG. 5.

Thereafter, when a difference between input rotation and output rotation of the clutch device 26 decreases, and the hydraulic pressure of the slave cylinder 28 side (the downstream side) reaches a lower limit holding hydraulic pressure LP, the fastening of the clutch device 26 transitions to a locked state, and all the driving force of the engine 13 is transmitted to the transmission 21. This state corresponds to an area C illustrated in FIG. 5. The areas A to C form a starting area.

In order to supply a hydraulic pressure from the master cylinder 51 side to the slave cylinder 28 side, the solenoid valve 56 is caused to be in the open-valve state, the motor 52 is driven to rotate in normal direction through conduction, and the master cylinder 51 is pressed. In this way, the hydraulic pressure of the slave cylinder 28 side is adjusted to a clutch fastening hydraulic pressure. At this time, the driving of the clutch actuator 50 is controlled through feedback based on a detected hydraulic pressure acquired by the downstream-side hydraulic pressure sensor 58.

Then, when the hydraulic pressure of the slave cylinder 28 side (the downstream side) reaches an upper limit holding hydraulic pressure HP, power is supplied to the solenoid valve 56, and the solenoid valve 56 operates to be closed, and the supply of power to the motor 52 is stopped, and the generation of the hydraulic pressure is stopped. In other words, the upstream side becomes in a low pressure state in accordance with release of the hydraulic pressure, and the downstream side is maintained to be in the high pressure state (the upper limit holding hydraulic pressure HP). In this way, the clutch device 26 is maintained to be in the fastened state without the master cylinder 51 generating a hydraulic pressure, and the power consumption can be inhibited while running of the motorcycle 1 is enabled.

Here, depending on a transmission operation, there may be also cases in which transmission is performed immediately after a hydraulic pressure is filled in the clutch device 26. In such a case, before the solenoid valve 56 operates to be closed to cause the upstream side to be in a low pressure state, the motor 52 is reversely driven in an open-valve state of the solenoid valve 56, the master cylinder 51 is decompressed and is caused to communicate with the reservoir 51e, and the hydraulic pressure of the clutch device 26 side is relieved on the master cylinder 51 side. At this time, the driving of the clutch actuator 50 is controlled through feedback on the basis of a detected hydraulic pressure acquired by the upstream-side hydraulic pressure sensor 57.

Figure 5:
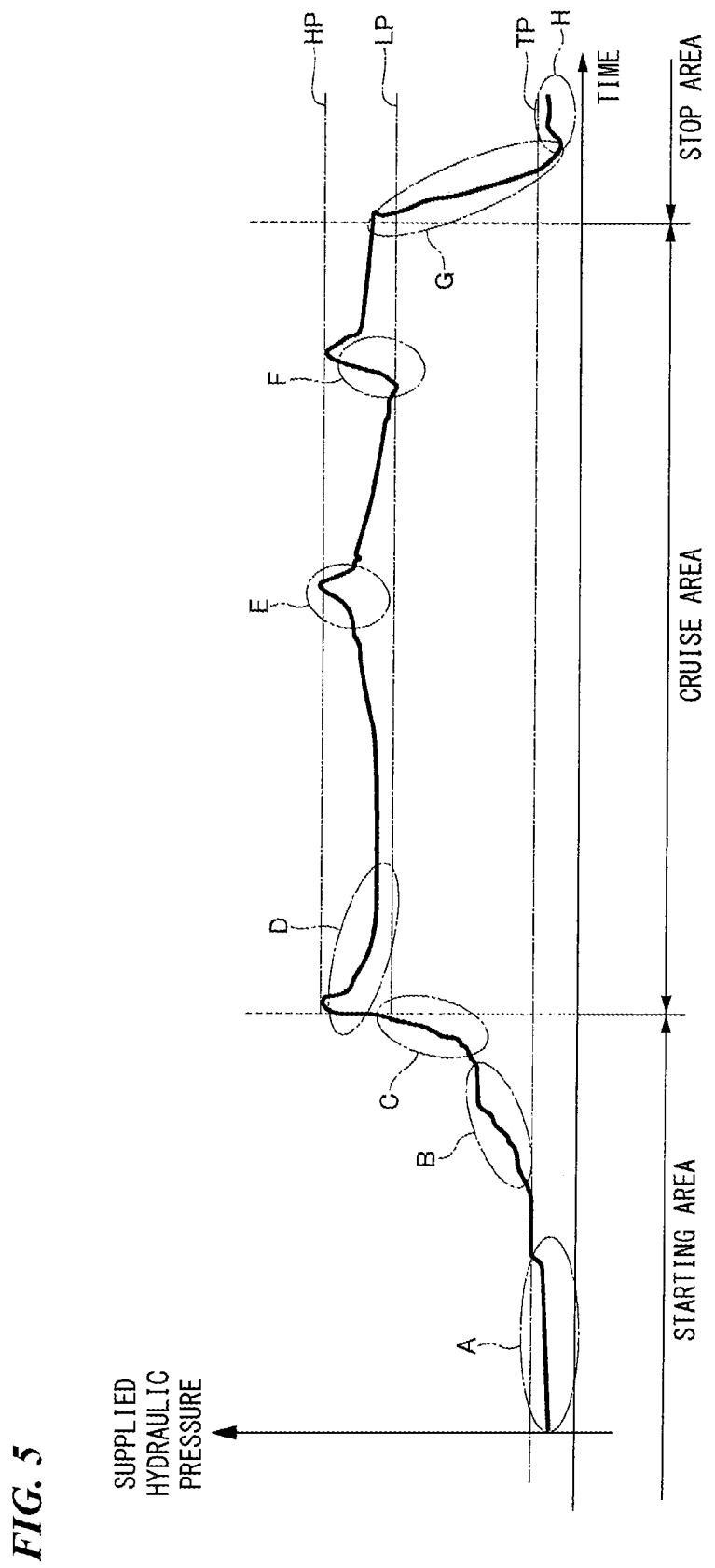
FIG. 5 is a graph illustrating changes in a supplied hydraulic pressure of a clutch actuator.

Even in a state in which the solenoid valve 56 is closed, and the clutch device 26 is maintained to be in the fastened state, as in an area D illustrated in FIG. 5, the hydraulic pressure of the downstream side gradually decreases (leaks). In other words, the hydraulic pressure of the downstream side gradually decreases in accordance with factors such as a leakage of the hydraulic pressure and a temperature decrease according to deformation of seals of the solenoid valve 56 and the one-way valve 53c1.

Meanwhile, as in an area E illustrated in FIG. 5, there are also cases in which a hydraulic pressure of the downstream side rises in accordance with a rise in the temperature and the like. A fine hydraulic pressure variation of the downstream side can be absorbed by an accumulator not illustrated in the drawing, and there is no increase in power consumption according to the operating of the motor 52 and the solenoid valve 56 every time the hydraulic pressure changes.

As in an area E illustrated in FIG. 5, in a case in which a hydraulic pressure of the downstream side rises up to the upper limit holding hydraulic pressure HP, by decreasing the supply of power to the solenoid valve 56 or the like, the solenoid valve 56 is caused to be in an open-valve state in a stepped manner, and the hydraulic pressure of the downstream side is relieved toward the upstream side.

As illustrated in an area F illustrated in FIG. 5, in a case in which the hydraulic pressure of the downstream side decreases to the lower limit holding hydraulic pressure LP, the solenoid valve 56 starts to supply power to the motor 52 with the valve closed and raises the hydraulic pressure of the upstream side. When the hydraulic pressure of the upstream side is above the hydraulic pressure of the downstream side, this hydraulic pressure is supplied (recharged) to the downstream side through the bypass oil path 53c and the one-way valve 53c1. When the hydraulic pressure of the downstream side becomes the upper limit holding hydraulic pressure HP, the supply of power to the motor 52 is stopped, and the generation of the hydraulic pressure stops. In this way, the hydraulic pressure of the downstream side is maintained between the upper limit holding hydraulic pressure HP and the lower limit holding hydraulic pressure LP, and the clutch device 26 is maintained to be in the fastened state. The areas D to F are set to a cruise area.

In a case in which the transmission 21 becomes neutral when the motorcycle 1 stops, the supply of power to both the motor 52 and the solenoid valve 56 is stopped together. In this way, the master cylinder 51 stops the generation of a hydraulic pressure and stops the supply of a hydraulic pressure to the slave cylinder 28. The solenoid valve 56 becomes an open-valve state, and the hydraulic pressure of the inside of the downstream-side oil path 53b is returned to the reservoir 51e. As above, the slave cylinder 28 side (the downstream side) becomes a low pressure state having a hydraulic pressure lower than the touch point hydraulic pressure TP, and the clutch device 26 becomes a non-fastened state. This state corresponds to areas G and H illustrated in FIG. 5. The areas G and H will be set as a stop area.

Meanwhile, with the transmission 21 being in the in-gear state when the motorcycle 1 stops, a standby state in which a standby hydraulic pressure WP is applied to the slave cylinder 28 side is formed.

The standby hydraulic pressure WP is a hydraulic pressure that is slightly lower than the touch point hydraulic pressure TP for which the coupling of the clutch device 26 starts and is a hydraulic pressure (a hydraulic pressure applied in the areas A and H illustrated in FIG. 5) for which the clutch device 26 is not coupled. In accordance with the application of the standby hydraulic pressure WP, invalid filling of the clutch device 26 (cancelation of deteriorations and operating reaction forces of parts and application of preloads to a hydraulic path, and the like) can be performed, and operation responsiveness at the time of coupling the clutch device 26 is improved.

Next, transmission control of the motorcycle 1 will be described.

In an in-gear stop state in which the gear position of the transmission 21 is in an in-gear state of the first speed, and the vehicle speed is lower than a setting value corresponding to stopping, the motorcycle 1 according to this embodiment performs control of decreasing the standby hydraulic pressure WP supplied to the slave cylinder 28 when a shift operation on the shift pedal 32 from the first speed to the neutral is performed.

Here, in a case in which the motorcycle 1 is in the stop state, and a gear position of the transmission 21 is any one transmission step position other than the neutral, in other words, in a case in which the transmission 21 is in the in-gear stop state, a standby hydraulic pressure WP set in advance is supplied to the slave cylinder 28.

The standby hydraulic pressure WP is set to a first setting value P1 (see FIG. 10) that is a standard standby hydraulic pressure at a normal time (in the case of a non-detected state in which a transmission operation of the shift pedal 32 is not detected). In this way, the clutch device 26 comes into a standby state in which the invalid filling is performed, and the responsiveness at the time of clutch fastening is improved. In other words, when the speed of the engine 13 is increased by a driver increasing a throttle opening degree, fastening of the clutch device 26 is immediately started in accordance with the supply of a hydraulic pressure to the slave cylinder 28, and quick start and acceleration of the motorcycle 1 can be performed.

In order to detect a driver's shift operation on the shift pedal 32, the motorcycle 1 includes the shift operation detecting switch 48 in addition to the shift load sensor 42.

Then, in the in-gear stop state, when the shift operation detecting switch 48 detects a shift operation from the first speed to the neutral, the hydraulic pressure control unit 61 performs control of setting the standby hydraulic pressure WP to a second setting value P2 (a low standby hydraulic pressure; see FIG. 10) lower than the first setting value P1 that is a setting value before the transmission operation.

In a case in which the transmission 21 is in the in-gear state, a standard standby hydraulic pressure corresponding to the first setting value P1 is supplied to the slave cylinder 28 at a normal time, and accordingly, a slight pattern, so-called dragging is generated in the clutch device 26. At this time, there are cases in which a dog and a slot (dog hole) engaged with each other in the dog clutch of the transmission 21 press each other in the rotation direction, and resistance of engagement release is generated, and the shift operation becomes heavy. In such a case, when the standby hydraulic pressure WP supplied to the slave cylinder 28 is decreased to a low standby hydraulic pressure corresponding to the second setting value P2, the engagement between the dog and the slot can be easily released, and the shift operation becomes light.

Figure 6:
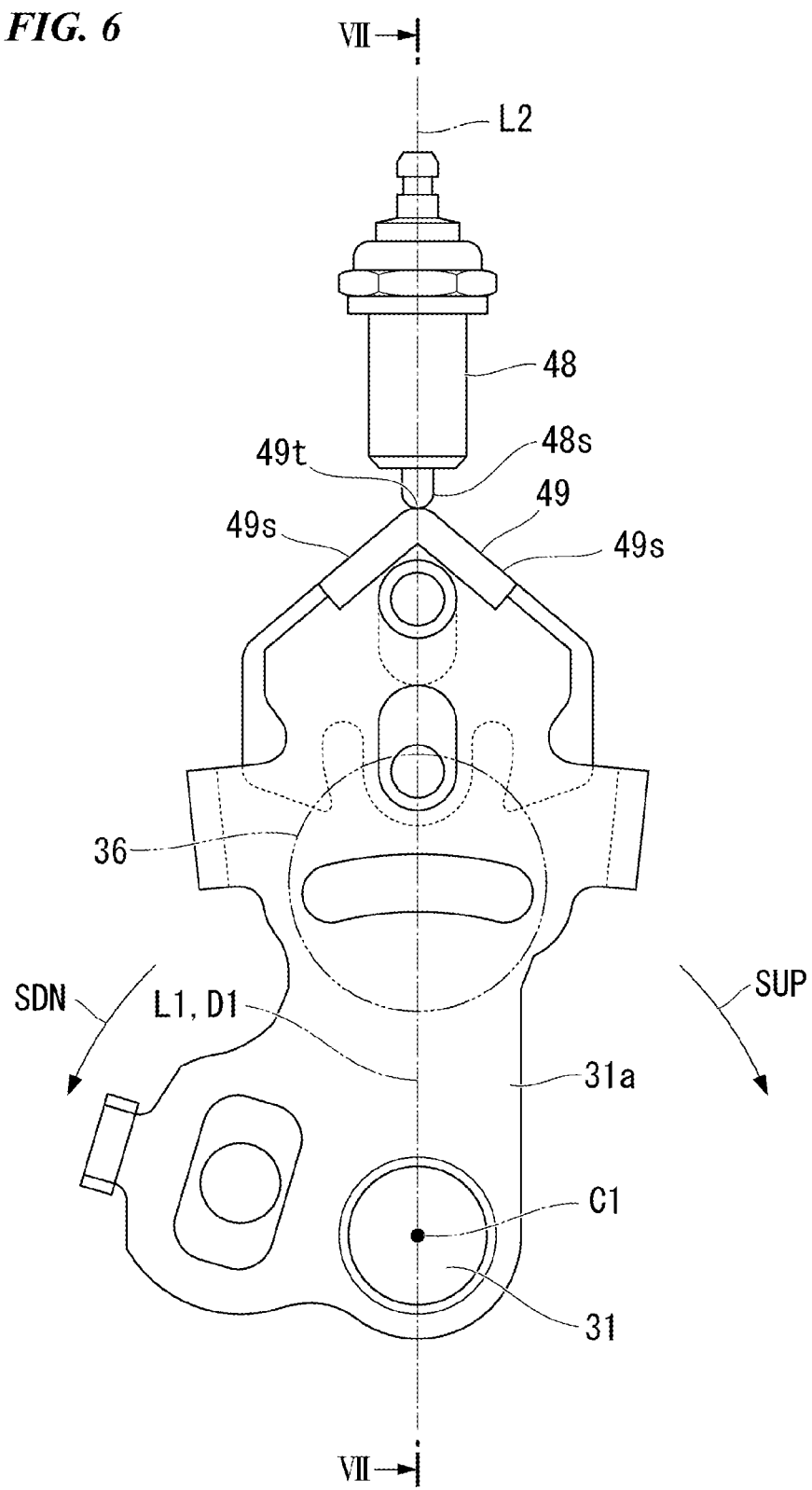
FIG. 6 is a front view of a shift arm and a shift operation detecting switch seen in an axial direction of a shift spindle.
Figure 7:
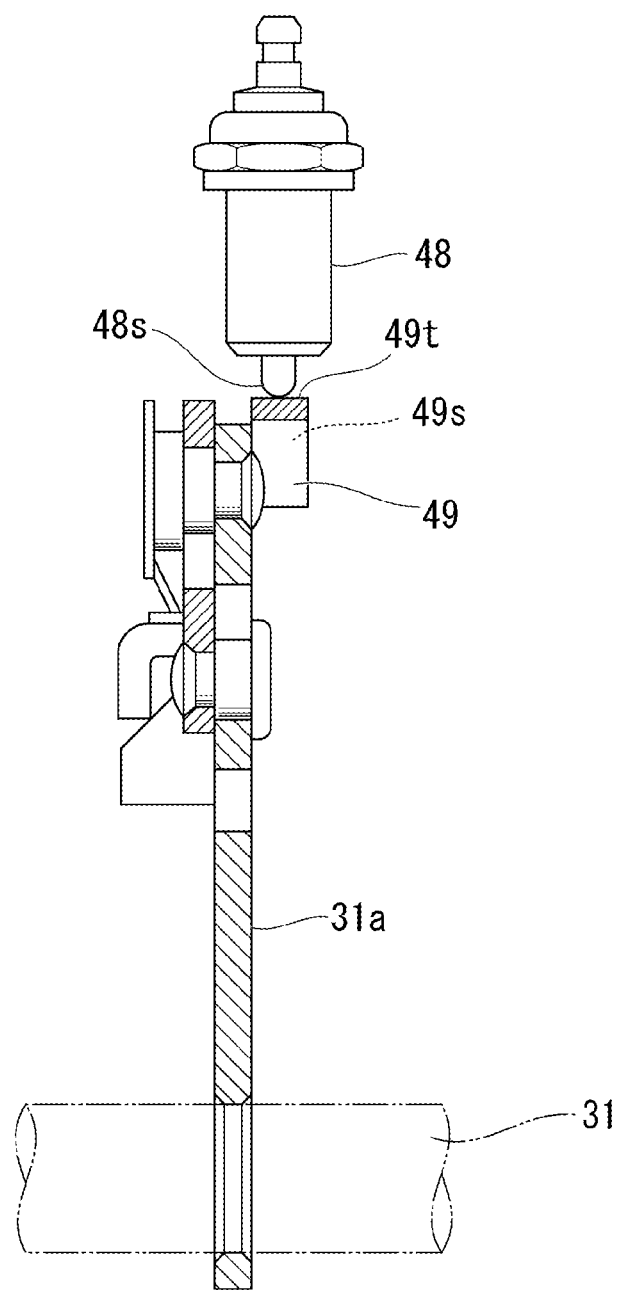
FIG. 7 is a cross-sectional view taken along line VII-VII illustrated in FIG. 6.

As illustrated in FIGS. 6 and 7, the shift operation detecting switch 48 is disposed to face an outer peripheral end of the shift arm 31*a*, which extends from the rotation center (shaft center) C1 of the shift spindle 31 to an outward side in a diameter direction, in the diameter direction. In FIG. 6, an arrow SUP represents a shift up side in the rotation direction of the shift spindle 31, and an arrow SDN represents a shift down side in the rotation direction of the shift spindle 31.

Referring to FIG. 6, the shift arm 31*a* extends along an extending reference line L1 passing through the shaft center C1. The shift operation detecting switch 48 is supported at the transmission case 17 side, and the shift arm 31*a* relatively rotates with respect to the shift operation detecting switch 48.

The shift operation detecting switch 48 forms a cylindrical shape and is disposed to have a center line L2 along the diameter direction of the shift spindle 31. The shift operation detecting switch 48 includes a probe 48*s* that performs stroke along the center line L2. The probe 48*s* protrudes toward a detection target member 49 disposed at an outer peripheral end of the shift arm 31*a*.

The shift arm 31*a* has a position at which an extending line of the extending reference line L1 coincides with the center line L2 of the shift operation detecting switch 48 as a neutral position D1. The shift arm 31*a* is biased toward the neutral position D1 by a return spring not illustrated in the drawing. The detection target member 49 is disposed in the outer peripheral end of the shift arm 31*a* to face the shift operation detecting switch 48. The detection target member 49 forms a convex "V" shape on the outward side in the diameter direction and is disposed in a symmetrical form with respect to the extending reference line L1. The detection target member 49 includes a protruding apex part 49*t* formed toward the outward side in the diameter direction and one pair of inclining face parts 49*s* formed on both sides of the protruding apex part 49*t* in the rotation direction of the shift spindle 31. The one pair of inclining face parts 49*s* are disposed to be approximately perpendicular to each other. The protruding apex part 49*t* is chamfered to be round with a radius equivalent to that of a tip end spherical face of the probe 48*s* of the shift operation detecting switch 48.

As illustrated in FIG. 6, the shift arm 31*a* is disposed at the neutral position D1 in a state in which an operating load from the shift pedal 32 is not applied. At this time, the protruding apex part 49*t* of the detection target member 49 confronts with the probe 48*s* of the shift operation detecting switch 48 in the diameter direction. In this way, the probe 48*s* of the shift operation detecting switch 48 comes into an immersion state, and the shift operation detecting switch 48 comes into an On or Off state (the On state in the drawing).

Figure 8:
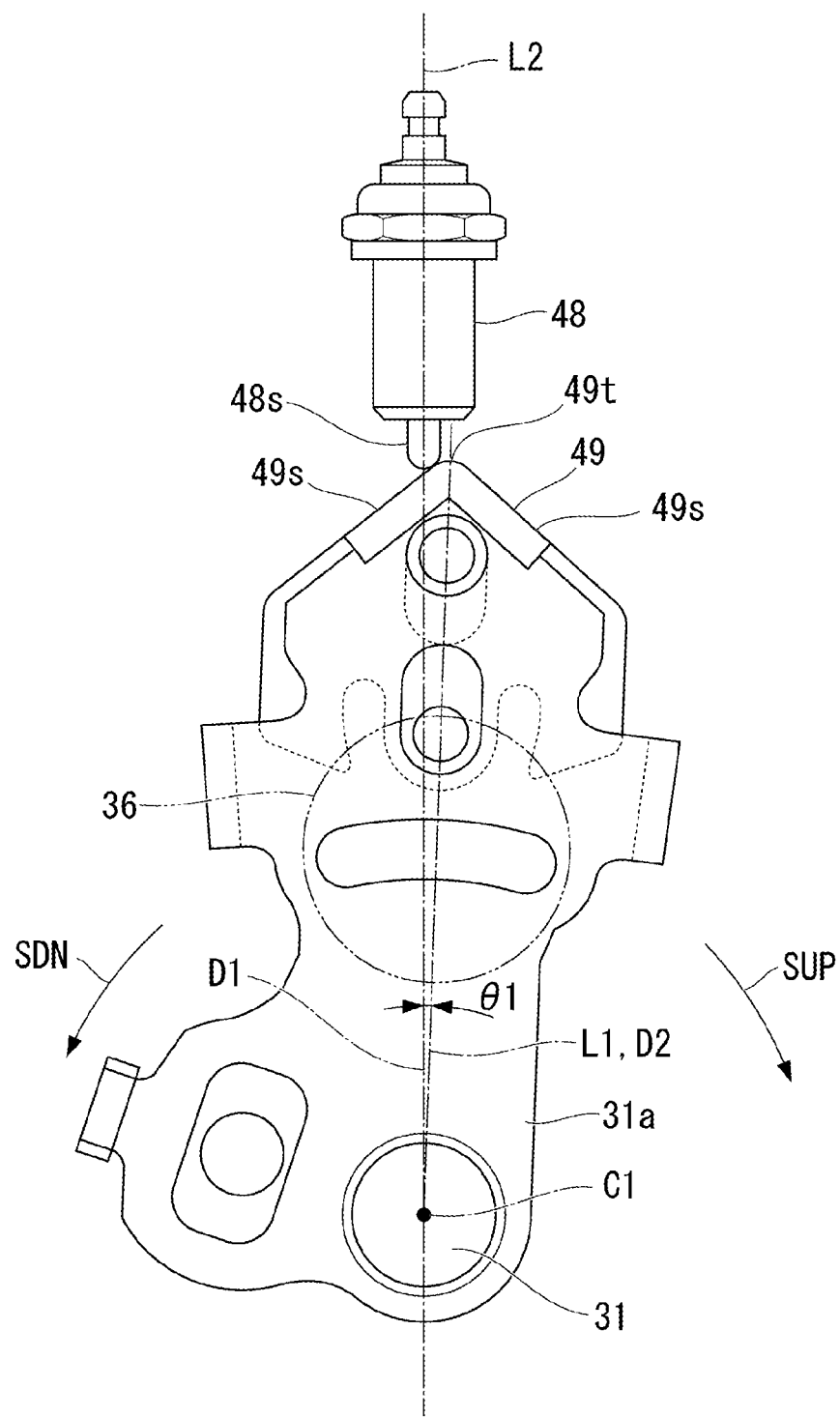
FIG. 8 is a front view of a state in which a shift operation detecting switch detects a shift operation corresponding to FIG. 6.

On the other hand, as illustrated in FIG. 8, when the shift spindle 31 rotates by applying an operation load to the shift pedal 32, the shift arm 31*a* also integrally rotates. In FIG. 8, the shift spindle 31 and the shift arm 31*a* rotate to the shift up side. When the shift arm 31*a* rotates, the protruding apex part 49*t* of the detection target member 49 displaces in the circumferential direction with respect to the probe 48*s* of the shift operation detecting switch 48. Then, the probe 48*s* changes to a protruding state while coming into sliding contact with one of the one pair of inclining face parts 49*s* and switches the On/Off state of the shift operation detecting switch 48. In this way, the ECU 60 detects rotation from the neutral position D1 of the shift spindle 31, in other words, a transmission operation on the shift pedal 32. A rotation position (shift operation detecting position) D2 of the shift arm 31*a* at this time is a position rotated by a small angle θ1 of 2 to 3 degrees from the neutral position D1.

In addition, in FIGS. 6 and 8, although it is illustrated that On/Off is detected as On according to immersion of the probe 48*s* and Off according to protrusion thereof, On/Off may be detected as On according to the probe 48*s* coming into contact with the inclining face part 49*s* and Off according to no contact therebetween.

In this way, by disposing the detection target member 49 having the protruding apex part 49*t* in the outer peripheral end of the shift arm 31*a* extending to a further outer circumferential side than the shift spindle 31, the shift operation detecting switch 48 detects slight rotation of the shift spindle 31 according to a transmission operation on the shift pedal 32 with high sensitivity. In addition, compared to a case in which a transmission operation is detected on the basis of a shift operation load, a transmission operation can be detected on the basis of a rotation position of the shift arm 31*a* fixed to the shift spindle 31, and accordingly, detection can be performed with high sensitivity. In addition, a transmission operation can be more directly detected than in a case in which a displacement of an operation member (the shift drum 36 or the like) forming a body separate from the shift spindle 31 is detected.

Figure 9:
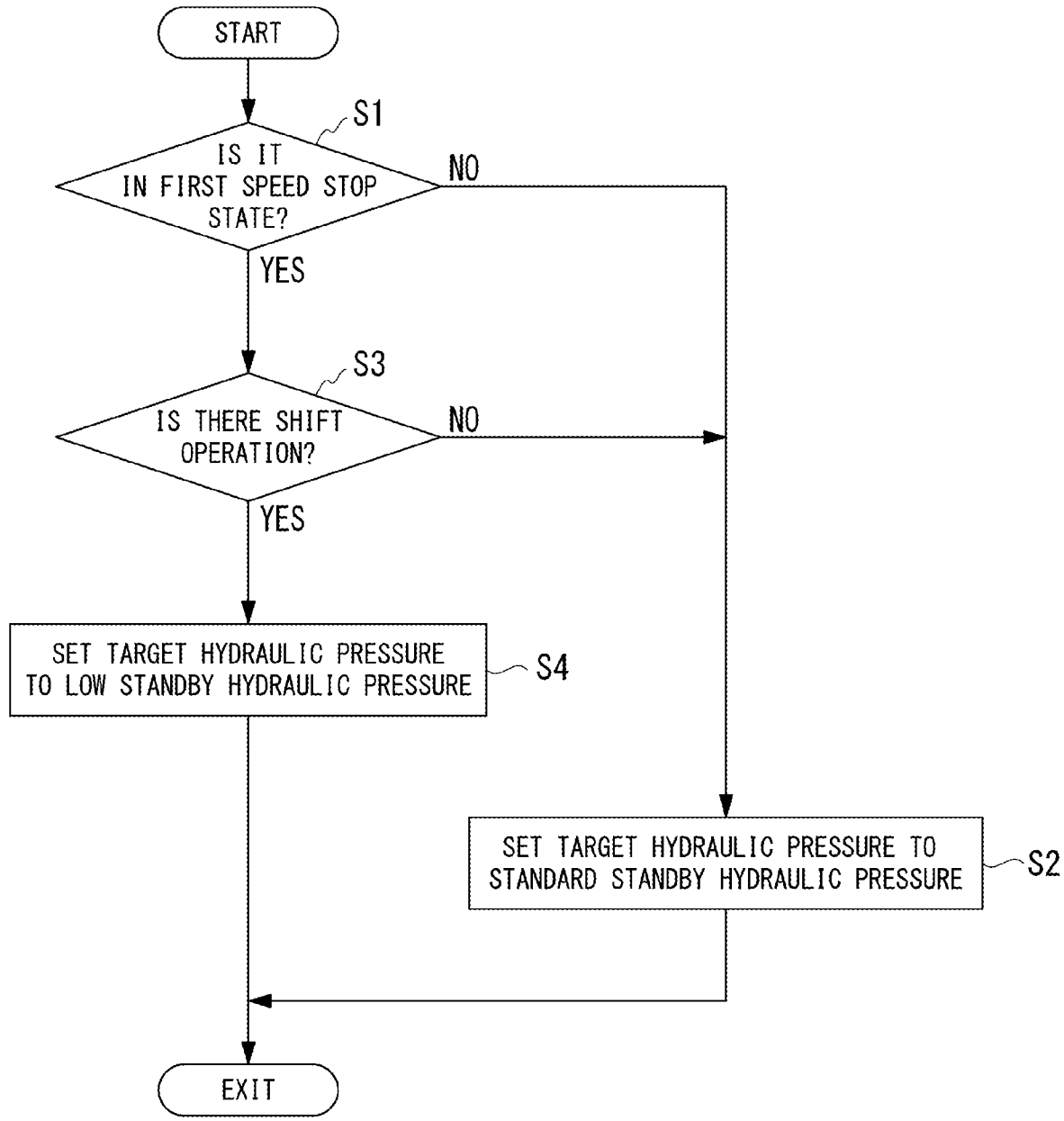
FIG. 9 is a flowchart illustrating a control flow of a standby hydraulic pressure when a shift operation from a first speed to neutral is performed in an in-gear vehicle stop state.

Next, one example of a process executed by the ECU 60 at the time of hydraulic pressure control in a case in which the vehicle is stopping with the gear position of the transmission 21 being at the first speed will be described with reference to the flowchart illustrated in FIG. 9. The control flow illustrated in FIG. 9 is repeatedly executed at a specified control period (1 to 10 msec) in a stop state in which the vehicle speed is lower than a setting value set in advance.

First, the ECU 60 determines whether or not the motorcycle 1 is in a stop state with the gear position being at the first speed (a first speed stop state; an in-gear stop state) (Step S1).

Here, the first speed stop state has a determination criterion that the gear position of the transmission 21 detected by the drum angle sensor 41 is the first speed, and the vehicle speed detected by the vehicle speed sensor 44 is lower than a setting value set in advance.

In this way, for example, at a clutch-open vehicle speed before complete stop, although the hydraulic pressure supplied to the slave cylinder 28 is configured to be decreased to the standby hydraulic pressure WP, the standby hydraulic pressure WP can be set to the second setting value P2 in accordance with the clutch-open vehicle speed, and a shift operation in the in-gear stop state can be easily performed reliably.

In addition, a determination criterion for the determination of whether or not the motorcycle 1 is in the stop state may include a condition that at least one of a throttle opening degree detected by the throttle opening degree sensor 43 being lower than a setting value set in advance and the speed of the engine 13 detected by the engine speed sensor 45 being lower than a setting value set in advance is satisfied.

In this way, in order to determine the stop state of the motorcycle 1, by using the throttle opening degree and the engine speed together with the vehicle speed, after a preparation step for stopping of the motorcycle 1 is checked, the second setting value P2 can be set, and a shift operation in the in-gear stop state can be easily performed reliably.

Referring back to FIG. 9, in Step S1, in a case in which it is determined that the motorcycle 1 is not in the first speed stop state (No in Step S1), the hydraulic pressure control unit 61 sets a target hydraulic pressure of the standby hydraulic pressure WP supplied to the slave cylinder 28 to a standard standby hydraulic pressure (the first setting value P1) (Step S2).

In Step S1, in a case in which it is determined that the motorcycle 1 is in the first speed stop state (Yes in Step S1), subsequently, the ECU 60 determines whether or not the shift operation detecting switch 48 has detected a transmission operation of the shift pedal 32 for transmitting the gear position of the transmission 21 from the first speed to the neutral (Step S3).

As a result, in a case in which it is determined that a transmission operation on the shift pedal 32 has not been detected (No in Step S3), the process proceeds to Step S2, and the hydraulic control unit 61 sets a target hydraulic pressure of the standby hydraulic pressure WP supplied to the slave cylinder 28 to the standard standby hydraulic pressure.

On the other hand, in a case in which it is determined that the transmission operation on the shift pedal 32 has been detected in Step S3 (Yes in Step S3), the hydraulic pressure control unit 61 sets a target hydraulic pressure of the hydraulic pressure supplied to the slave cylinder 28 to a low standby hydraulic pressure (the second setting value P2) that is lower than the standard standby hydraulic pressure (Step S4). In this way, the standby hydraulic pressure WP supplied to the slave cylinder 28 is decreased, a load required for a transmission operation of the shift pedal 32 is decreased, and accordingly, transmission from the first speed to the neutral can be easily performed.

Figure 10:
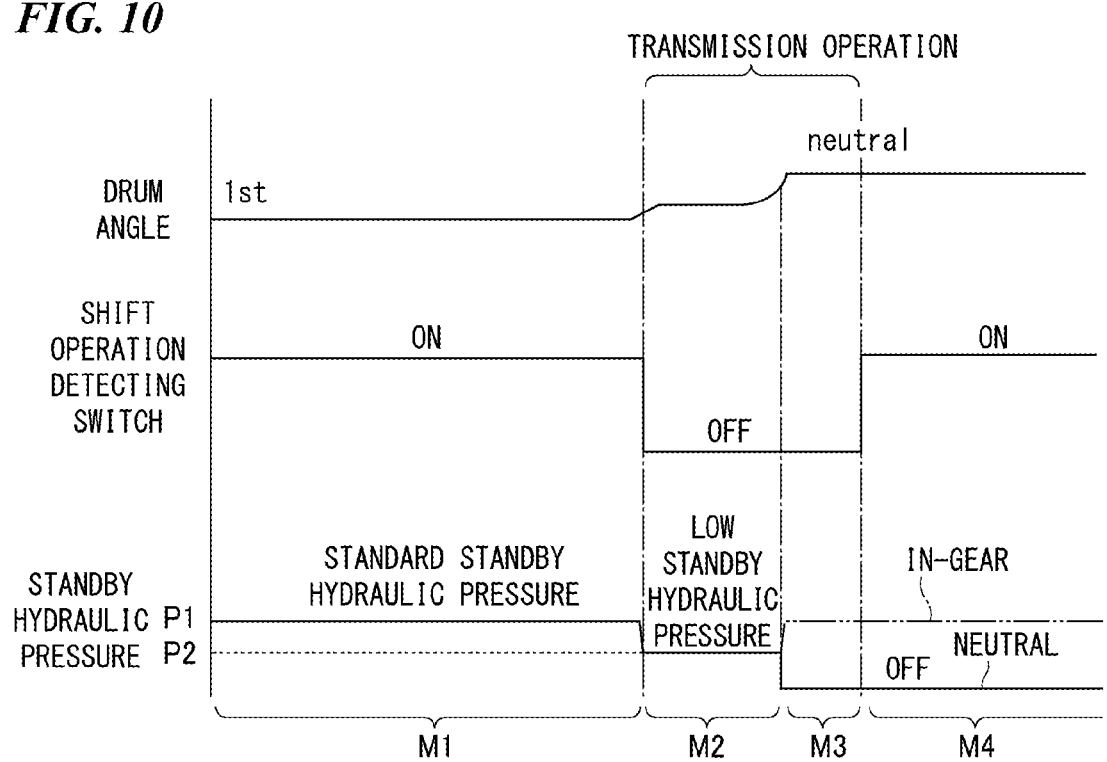
FIG. 10 is a timing diagram illustrating one example of changes in parameters of parts of a motorcycle when control according to the control flow illustrated in FIG. 9 is performed.

Here, as illustrated in FIG. 10, for example, the hydraulic pressure control unit 61 continues a state in which the standby hydraulic pressure WP is set to the second setting value P2 until rotation of the shift drum 36 disposed on a further transmission 21 side than the shift arm 31a is detected.

The rotation of the shift drum 36 occurs by releasing the engagement of the dog clutch of the transmission 21, and accordingly, by continuing the state in which the standby hydraulic pressure WP is set to the second setting value P2 until the rotation of the shift drum 36 is detected, the weight of a shift operation due to the resistance of the dog clutch can be avoided, and the shift operation can be light performed reliably.

Figure 11:
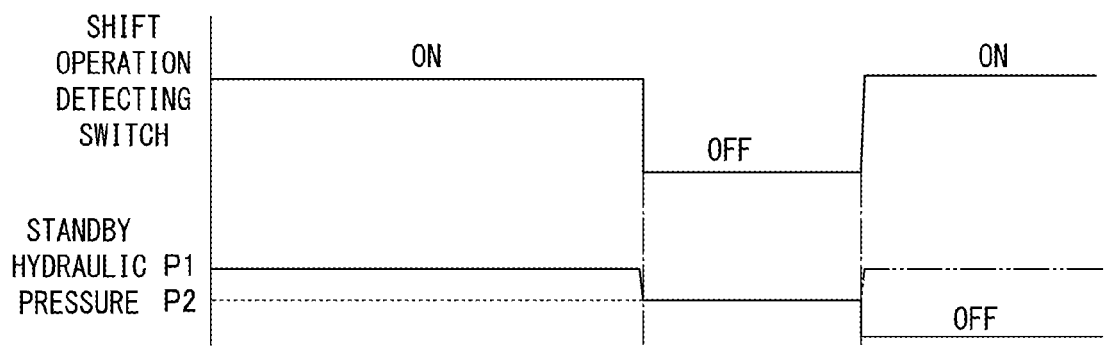
FIG. 11 is a timing diagram illustrating a modified example of changes in a slave cylinder hydraulic pressure when control according to the control flow illustrated in FIG. 9 is performed.

In addition, as illustrated in FIG. 11, the hydraulic pressure control unit 61 may continue the state in which the standby hydraulic pressure WP is set to the second setting value P2 until a detection state in which the shift operation detecting switch 48 detects a shift operation transitions to a non-detection state in which no shift operation is detected.

In this way, by continuing the state in which the standby hydraulic pressure WP is set to the second setting value P2 until the shift operation ends also can lighten the shift operation reliably.

Figure 12:
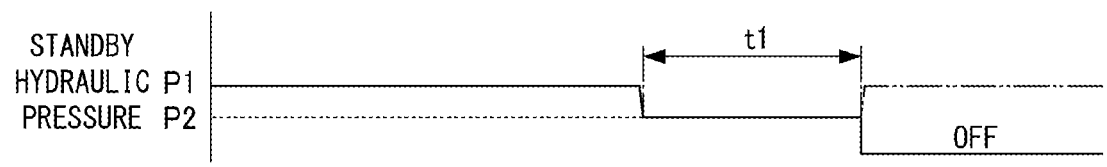
FIG. 12 is a timing diagram illustrating another modified example of changes in a slave cylinder hydraulic pressure when control according to the control flow illustrated in FIG. 9 is performed.

In addition, as illustrated in FIG. 12, the hydraulic pressure control unit 61 may continue the state in which the standby hydraulic pressure WP is set to the second setting value P2 only for a setting time t1 set in advance.

In this case, by continuing the state in which the standby hydraulic pressure WP is set to the second setting value P2 for only an arbitrary setting time, feeling can be improved as control not depending on the speed of the shift operation.

Referring to FIG. 10, one example of changes in the units when control of the control flow as illustrated in FIG. 9 is executed will be described.

First, when the motorcycle 1 decelerates, and the vehicle speed becomes lower than a setting value (for example, a clutch-open vehicle speed) set in advance, a stop state of the motorcycle 1 is determined. At this time, when the motorcycle 1 comes into the stop state with the gear position being the first speed, a standard standby hydraulic pressure is supplied to the slave cylinder 28 as the standby hydraulic pressure WP (state M1).

In this state, when a driver adds an operation load to the shift pedal 32, a detection signal of the shift operation detecting switch 48 changes, and a transmission operation on the shift pedal 32 is detected (states M2 and M3). Then, the hydraulic pressure control unit 61 decreases the standby hydraulic pressure WP supplied to the slave cylinder 28 from the standard standby hydraulic pressure to the low standby hydraulic pressure.

Thereafter, in accordance with an operation on the shift pedal 32, the shift spindle 31 rotates and changes the drum angle of the shift drum 36, and the gear position of the transmission 21 is changed from the first speed to the neutral. By detecting such a change on the basis of the drum angle, the hydraulic pressure control unit 61 stops the supply of a hydraulic pressure to the slave cylinder 28 and causes the clutch device 26 to be in a non-fastened state (state M3).

When the shift to the neutral is completed, soon, a driver stops application of an operation load to the shift pedal 32, and accordingly, the detection signal of the shift operation detecting switch 48 transitions to the non-detected state (state M4).

Here, in a case in which the gear position of the transmission 21 is changed to an in-gear state of the second speed or a higher speed, the hydraulic pressure control unit 61 returns the standby hydraulic pressure WP supplied to the slave cylinder 28 to the standard standby hydraulic pressure (denoted using chain lines in the states M3 and M4).

In addition, in this embodiment, although control performed in a case in which a shift operation from the first speed to the neutral is performed has been mainly described, the control is not limited thereto, and also control performed in a case in which a shift operation is performed from a certain gear position to another gear position can be similarly applied.

As described above, the vehicle transmission system according to the embodiment described above includes: the transmission 21 of which transmission is performed in accordance with an operation of a driver of the motorcycle 1; the clutch device 26 that is disposed between a power transmission path between the transmission 21 and the engine 13 and is coupled or decoupled in accordance with an operation of the clutch actuator 50; the hydraulic pressure control unit 61 that controls coupling/decoupling of the clutch device 26 according to the clutch actuator 50; and the shift operation detecting switch 48 that detects a shift operation of the driver on the shift pedal 32. When a hydraulic pressure is supplied from the clutch actuator 50 to the slave cylinder 28, the clutch device 26 moves to a connection side, in an in-gear stop state in which the transmission 21 is in an in-gear state, and the motorcycle 1 is in a stop state, the clutch actuator 50 supplies a standby hydraulic pressure WP to the slave cylinder 28, and the hydraulic pressure control unit 61 sets the standby hydraulic pressure WP to a first setting value P1 during non-detection in which the shift operation is not detected by the shift operation detecting switch 48 and sets the standby hydraulic pressure WP to a second setting value P2 lower than the first setting value P1 when the shift operation is detected by the shift operation detecting switch 48.

According to this configuration, in an in-gear stop state in which the transmission 21 is in an in-gear state, and the motorcycle 1 is in a stop state, when the shift operation detecting switch 48 detects a shift operation, a standby hydraulic pressure WP supplied to the slave cylinder 28 is decreased. Accordingly, resistance due to a contact between a driving side and a driven side of engagement elements (a dog clutch) of the transmission 21 in a rotation direction is reduced, and a shift operation of the transmission 21 can be configured to be light. In other words, even in a case in which a vehicle stops in a case in which the transmission 21 is in the in-gear state, a shift operation can be easily performed.

In addition, in the vehicle transmission system, the hydraulic pressure control unit 61 sets the standby hydraulic pressure WP to the second setting value P2 in a case in which a shift operation causing the shift pedal 32 to swing to an upper side is detected by the shift operation detecting switch 48. For example, in a case in which a shift operation causing the gear position of the transmission 21 from the first speed to the neutral is detected, the hydraulic pressure control unit 61 sets the standby hydraulic pressure WP to the second setting value P2.

According to this configuration, the standby hydraulic pressure WP is decreased in a case in which a shift operation causing the shift pedal 32 to swing to an upper side is detected, and accordingly, erroneous detection of a shift operation according to a load of a foot on the shift pedal 32 can be eliminated. In addition, normally, the transmission 21 is shifted up in accordance with swing of the shift pedal 32 to the upper side, and neutral is positioned between the first speed and the second speed of the gear position. Accordingly, when a shift change from the first speed to the neutral is performed at the time of stopping the vehicle, by decreasing the standby hydraulic pressure WP, a neutral output can be easily performed.

In addition, the vehicle transmission system described above includes the shift spindle 31 that protrudes from the transmission case 17 and is connected to the shift pedal 32 and the shift arm 31a that is fixed to the shift spindle 31 inside the transmission case 17 and transmits movement to the transmission 21 side by swinging from a neutral position D1 in accordance with the shift operation on the shift pedal 32, and the shift operation detecting switch 48 detects movement of the shift arm 31a from the neutral position D1.

According to this configuration, the standby hydraulic pressure WP is decreased in accordance with detection of movement of the shift arm 31a fixed to the shift spindle 31 from the neutral position D1, and accordingly, compared to a case in which movement of the shift drum 36 or the like that is disposed on a further transmission 21 side than the shift arm 31a is detected, or a shift operation load is detected, a shift operation can be detected also for slight movement in the initial period of the shift operation.

In addition, in the motorcycle 1, in a case in which a stop state is formed with the gear position being a high gear of the second speed or higher, when a driver tries to shift down the gear position, in a case in which the gear of the transmission 21 cannot be transmitted to a gear position of the lower step side, hydraulic pressure control as below is performed.

In other words, when the motorcycle 1 is in the in-gear stop state, the ECU 60 determines whether or not the gear position of the transmission 21 is the second speed or higher. In addition, it is also determined whether the throttle opening degree is lower than a setting value set in advance, whether a shift load is smaller than a setting value set in advance, and whether the speed of the engine 13 is lower than a setting value set in advance.

In this example, in a case in which the motorcycle is not stopped with the second speed or higher, in other words, is stopped with the first speed, the standby hydraulic pressure WP supplied to the slave cylinder 28 is set to the standard standby hydraulic pressure.

On the other hand, in a case in which the motorcycle is stopped with the second speed or higher, thereafter, it is sequentially determined whether or not a shift down operation has been performed, and engagement of the dog clutch of the transmission gear has been released. In a case in which "No" is acquired at least one of these two determinations, the standby hydraulic pressure WP is set to the standard standby hydraulic pressure. In a case in which "No" is not acquired in the two determination described above, next, it is determined whether or not a transmission to a lower step gear has been performed (whether or not engagement of the dog clutch has been performed). In a case in which a transmission to the lower step gear has been performed, the standby hydraulic pressure WP is set to the standard standby hydraulic pressure. On the other hand, in a case in which a transmission to the lower step gear has not been performed, there is a possibility that a dog contact occurs in the dog clutch of the lower step gear. In this case, the standby hydraulic pressure WP is set to a high standby hydraulic pressure higher than the standard standby hydraulic pressure, and the clutch device 26 is slightly moved to a fastening side. In this way, by causing the driving side and the driven side of the dog clutch to generate relative rotation, and the dog contact of the dog clutch can be resolved.

In addition, in the motorcycle 1, at the time of starting the engine and in a case in which the gear position is transitioned from the neutral state to the first speed or the second speed or the second speed or higher, hydraulic pressure control as below is performed.

In other words, at the time of stopping the engine and an at the time of neutral, a hydraulic pressure is not applied to the slave cylinder 28, and accordingly, the piston of the slave cylinder 28 is positioned at a stroke start end position. When a hydraulic pressure is applied to the slave cylinder 28 in this state, the piston displaces to the clutch fastening side from the stroke start end position in accordance with the hydraulic pressure. However, at the time of this displacement, a stoke loss occurs in the piston due to an action of frictional resistance and the like for the inner wall of the slave cylinder 28.

In a case in which the clutch fastening hydraulic pressure decreases to be the standby hydraulic pressure WP, the slave cylinder 28 stops the piston at a standby position. On the other hand, at the time of increasing the pressure from a state in which the supply of the hydraulic pressure is stopped such as at the time of starting the engine and at the time of transmission from the neutral to the in-gear, even when the standby hydraulic pressure WP is applied to the slave cylinder 28, the piston displaces only up to a position in front of the standby position.

Thus, at the time of increasing the pressure from a state in which the supply of the hydraulic pressure is stopped such as at the time of starting the engine and at the time of transmission from the neutral to the in-gear, a high standby hydraulic pressure higher than the standard standby hydraulic pressure is applied to the slave cylinder 28. In this way, even when there is a stoke loss in the piston at the time of increasing the pressure, the piston can be caused to displace up to the standby position in accordance with an increase in the hydraulic pressure.

As a result, in any of a case in which the motorcycle starts from the in-gear stop state, a case in which the motorcycle transitions from the neutral to the in-gear state and starts and a case in which the motorcycle immediately starts after the start of the engine, the operation feeling of the clutch device 26 is equal. The control of causing the standby hydraulic pressure to be a high standby hydraulic pressure is performed only once for the first time during starting of the engine and the in-gear state.

In addition, the present invention is not limited to the embodiments described above, and, for example, the shift operator is not limited to the shift pedal operated by the foot but may be lever operated by the hand or the like. In addition, an actuator that is electrically driven and performs a shift operation may be interposed therebetween.

The application is not limited to an application to a saddle riding-type vehicle in which the clutch operation is automated as in the embodiment and can be applied also to a saddle riding-type vehicle including a so-called clutch operation-less transmission device in which transmission can be performed by adjusting a driving force without performing a manual clutch operation under a predetermined condition while the manual clutch operation is basically performed.

In addition, the saddle riding-type vehicle includes a whole vehicle in which a driver gets over a vehicle body, includes not only a motorcycle (including a motor-attached bicycle and a scooter-type vehicle) but also three-wheel (including a vehicle having one front wheel and two rear wheels and a vehicle having two front wheels and one rear wheel) or four-wheel vehicle, and also includes a vehicle including an electric motor in a motor.

The components in the embodiments described above are examples of the present invention, and various changes can be made in a range not departing from the concept of the prevent invention such as substitutions of constituent elements of the embodiment with known constituent elements and the like.

BRIEF DESCRIPTION OF THE REFERENCE SYMBOLS

1: Motorcycle (saddle riding-type vehicle)
13: Engine
17: Transmission case
21: Transmission
26: Clutch device
28: Slave cylinder
31: Shift spindle
31a: Shift arm
32: Shift pedal (shift operator)
48: Shift operation detecting switch (shift operation detecting means)
50: Clutch actuator
61: Hydraulic pressure control unit (clutch control unit)
D1: Neutral position
P1: First setting value
P2: Second setting value
t1: Setting time
WP: Standby hydraulic pressure

What is claim is:

1. A vehicle transmission system comprising:
   a transmission of which transmission is performed in accordance with an operation of a driver of a vehicle;
   a clutch device that is disposed between a power transmission path between the transmission and an engine of the vehicle and is coupled or decoupled in accordance with an operation of a clutch actuator;
   a clutch control unit that controls coupling/decoupling of the clutch device according to the clutch actuator; and
   a shift operation detecting means that detects a shift operation of the driver on a shift operator,
   wherein, when a hydraulic pressure is supplied from the clutch actuator to a slave cylinder, the clutch device moves to a connection side,
   wherein, in an in-gear stop state in which the transmission is in an in-gear state, and the vehicle is in a stop state, the clutch actuator supplies a standby hydraulic pressure to the slave cylinder, and
   wherein the clutch control unit sets the standby hydraulic pressure to a first setting value during non-detection in which the shift operation is not detected by the shift operation detecting means and sets the standby hydraulic pressure to a second setting value lower than the first setting value when the shift operation is detected by the shift operation detecting means.

2. The vehicle transmission system according to claim 1, wherein the shift operator is a shift pedal, and
   wherein the clutch control unit sets the standby hydraulic pressure to the second setting value in a case in which a shift operation causing the shift pedal to swing to an upper side is detected by the shift operation detecting means.

3. The vehicle transmission system according to claim 1, wherein the clutch control unit sets the standby hydraulic pressure to the second setting value in a case in which a shift operation of shifting a gear position of the transmission from a first speed to neutral is detected.

4. The vehicle transmission system according to claim 1, wherein the clutch control unit continues a state in which the standby hydraulic pressure is set to the second setting value until a detection state in which the shift operation is detected by the shift operation detecting means transitions to a non-detection state in which the shift operation is not detected.

5. The vehicle transmission system according to claim 1, wherein the clutch control unit continues a state in which the standby hydraulic pressure is set to the second setting value for a setting time determined in advance.

6. The vehicle transmission system according to claim 1, further comprising:
   a shift spindle that protrudes from a transmission case and is connected to the shift operator; and
   a shift arm that is fixed to the shift spindle and transmits movement to the transmission side by swinging from a neutral position in accordance with the shift operation on the shift operator,
   wherein the shift operation detecting means detects movement of the shift arm from the neutral position.

7. The vehicle transmission system according to claim 1, wherein the clutch control unit determines that the vehicle is in the stop state in a case in which a vehicle speed is lower or equal to or lower than a setting value set in advance.

8. The vehicle transmission system according to claim 1, wherein the clutch control unit determines that the vehicle is in the stop state in a case in which at least one of a throttle opening degree being lower than or equal to or lower than a setting value set in advance and an engine speed being lower than or equal to or lower than a setting value set in advance is satisfied.

* * * * *